United States Patent
Clauss et al.

(10) Patent No.: US 8,696,914 B2
(45) Date of Patent: Apr. 15, 2014

(54) APPARATUS AND METHOD FOR PICKING UP PARTICLES FROM THE SURFACE OF A WATER SYSTEM

(75) Inventors: Günther Clauss, Berlin (DE); Florian Sprenger, Berlin (DE)

(73) Assignee: Technische Universität Berlin (DE)

( * ) Notice: Subject to any disclaimer, the term of this patent is extended or adjusted under 35 U.S.C. 154(b) by 320 days.

(21) Appl. No.: 13/127,076

(22) PCT Filed: Nov. 3, 2009

(86) PCT No.: PCT/DE2009/001526
§ 371 (c)(1),
(2), (4) Date: Jul. 5, 2011

(87) PCT Pub. No.: WO2010/060405
PCT Pub. Date: Jun. 3, 2010

(65) Prior Publication Data
US 2012/0125865 A1 May 24, 2012

(30) Foreign Application Priority Data
Nov. 3, 2008 (DE) .......................... 10 2008 055 633

(51) Int. Cl.
*E02B 15/04* (2006.01)
*E02B 15/10* (2006.01)
*C02F 103/00* (2006.01)

(52) U.S. Cl.
CPC ............... *E02B 15/046* (2013.01); *E02B 15/10* (2013.01); *C02F 2103/007* (2013.01); *Y10S 210/923* (2013.01)
USPC ................... 210/747.6; 210/776; 210/170.05; 210/170.11; 210/242.3; 210/923

(58) Field of Classification Search
USPC ......... 210/747.5, 747.6, 776, 170.05, 170.09, 210/170.11, 242.1, 242.3, 923
See application file for complete search history.

(56) References Cited

U.S. PATENT DOCUMENTS 3,615,017 A * 10/1971 Valdespino ................ 210/242.3
3,715,034 A    2/1973 Ivanoff
(Continued)

FOREIGN PATENT DOCUMENTS

DE    102 21 069 A1    1/2004
GB    1 440 024 A    6/1976

OTHER PUBLICATIONS

International Search Report; PCT/DE2009/001526; Int'l File Date: Nov. 3, 2009; Technische Universitaet Berlin; 2 pages.

(Continued)

*Primary Examiner* — Christopher Upton
(74) *Attorney, Agent, or Firm* — Schmeiser, Olsen & Watts, LLP

(57) ABSTRACT

The invention relates to an apparatus for picking up particles from the surface of a water system, in particular oil, algae or dirt particles, comprising a particle separation space, which is connected to an inflow opening through which water that contains particles can enter the particle separation space, a particle-collecting space into which particles that have been separated from the water that contains particles reach from the particle separation space via a separation mechanism and an adjustment mechanism, which is configured to regulate a filling level of the water that contains particles in the particle separation space. In addition, the invention relates to a method for picking up particles, in particular oil, algae or dirt particles, from the surface of a water system.

10 Claims, 1 Drawing Sheet

(56) References Cited

U.S. PATENT DOCUMENTS

| | | | |
|---|---|---|---|
| 3,853,768 A | | 12/1974 | Bagnulo |
| 3,966,615 A | | 6/1976 | Petchul et al. |
| 4,191,650 A | * | 3/1980 | Muneta .................. 210/242.3 |
| 4,356,086 A | * | 10/1982 | Oberg .................... 210/242.3 |
| 4,554,070 A | * | 11/1985 | Jordan ................... 210/242.3 |
| 4,728,440 A | | 3/1988 | Van Kuijeren |
| 4,851,133 A | * | 7/1989 | Rymal ........................ 210/776 |
| 4,921,605 A | * | 5/1990 | Chastan-Bagnis et al. ..................... 210/242.3 |
| 5,292,430 A | | 3/1994 | Sullivan et al. |
| 7,163,637 B2 | * | 1/2007 | Vannahme et al. .......... 210/776 |
| 7,182,860 B2 | * | 2/2007 | Lundin ........................ 210/923 |
| 2010/0314329 A1 | * | 12/2010 | Prior ......................... 210/242.3 |
| 2012/0067806 A1 | * | 3/2012 | Clauss et al. ............... 210/242.1 |

OTHER PUBLICATIONS

Written Opinion of the International Searching Authority; PCT/DE2009/001526; Int'l File Date: Nov. 3, 2009; Technische Universitaet Berlin; 11 pages.

International Preliminary Report on Patentability; PCT/DE2009/001526; Int'l File Date: Nov. 3, 2009; Technische Universitaet Berlin; 12 pages.

* cited by examiner

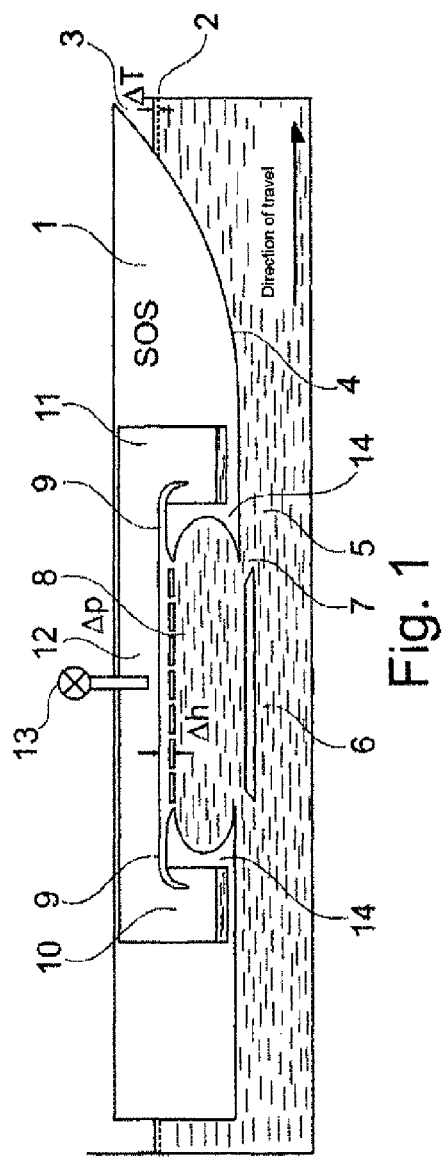
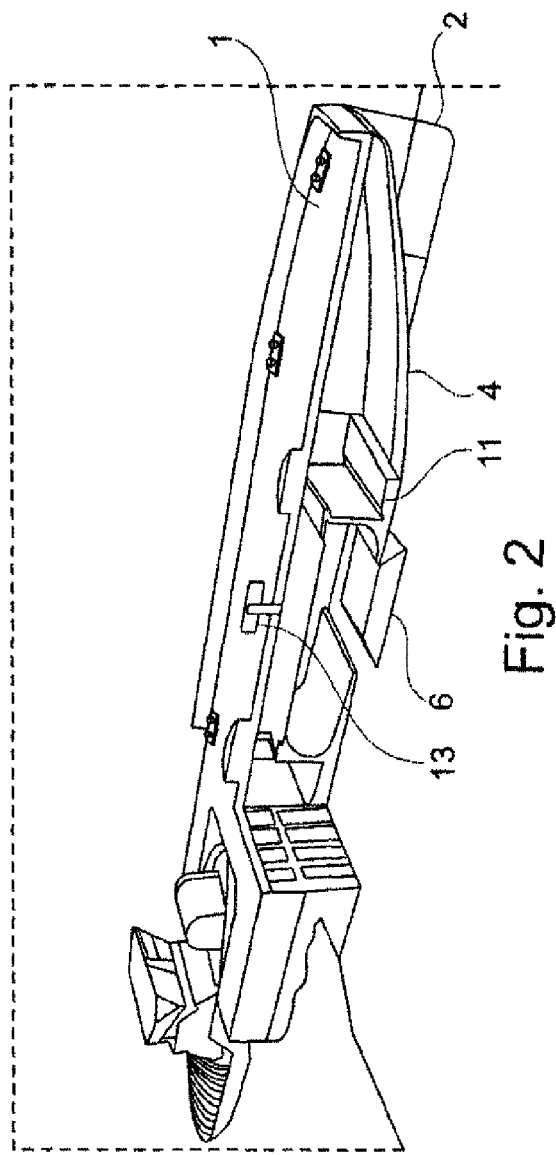

APPARATUS AND METHOD FOR PICKING UP PARTICLES FROM THE SURFACE OF A WATER SYSTEM

The invention relates to an apparatus and a method for picking up particles, in particular oil, algae or dirt particles, from the surface of a water system.

BACKGROUND

There is often a demand for cleaning surfaces of bodies of water such as lakes or oceans to remove pollutants. In the past, ship accidents, for example, have ended with disastrous consequences for the marine fauna and flora and have also entailed an economic catastrophe for the fishing and tourism industries located in the contaminated regions. The result of a shipwreck may be pollution due to the leaking oil in particular.

However, the causes for oil pollution of the surfaces of bodies of water are not limited to shipping accidents. Oil contamination also occurs due to industry in coastal regions, leaking pipes at the site of oil delivery itself, natural oil contamination at the ocean bottom as well as deliberate oil contamination by ship crews. To eliminate the layer of oil formed in various ways in the area of the surface of a water system, oil combating systems, in particular oil combating ships are used. In conjunction with the process of skimming the oil that has leaked, there is often the problem that oil control measures must be interrupted because of high seas. Such interruptions have negative consequences for the entire oil fighting crew, in particular the oil leakage may spread out as a thin layer of oil over a large area of the surface of water. In addition, at high seas the layer of oil is broken up into small lakes of oil, which are difficult to locate as part of the oil-fighting measure. In addition, the oil becomes emulsified, i.e., it combines with water and air and thus becomes increasingly more viscous, which makes the separation of oil from the surface of the water as well as the subsequent separation onboard the oil-fighting ships much more difficult.

The document DE 21 21 646 A1 describes a marine vessel for fighting oil layers. With this marine vessel, an opening is provided in the area of the bow section, through which water contaminated with particles of dirt, in particular oil particles, enters the hold as the marine vessel travels over the surface of the water and then the particles of dirt can be removed from this hold with the help of a suction device. After passing through the opening in the bow section, the water laden with particles of dirt flows past by an edge into the hold.

The document DE 102 21 069 B4 describes a device for picking up particles from the surface of a water system by utilizing hydrodynamic separation. In skimming an oil film from a water system, it flows along the underside of the bow of the oil-collecting device up to a separation blade, which separates the oil film from the main flow and introduces it into a particle separation chamber, which is also referred to as the moonpool. An eddy is formed at a breakaway edge of the separation blade which accelerates the oil being picked up toward the free water surface in the particle separation space. The particle-laden water entering the particle separation space in this way is processed further in that the particles of oil pass out of the particle separation space over a ramp and into the particle-collecting space. The particle-collecting space serves to concentrate the particles thereby separated. The particles are then pumped from there into storage tanks.

One key for efficient utilization of such a device is to minimize the water passing over the ramp into the particle collection space. To achieve this and at the same time to compensate for the dynamically changing low position of the ship because of the continuous uptake of oil, it has been proposed that height-adjustable embankments be used between the particle separation space and the particle collecting space. The use of ballast systems would also be conceivable. However, these measures require a relatively great technological effort and take up a great deal of space onboard the carrier ship accommodating the device. This is to the detriment of the storage volume available for the particles to be taken up.

SUMMARY

The object of the present invention is to create an apparatus and a method for picking up particles from the surface of a water system in which the efficiency of the particle uptake and particle separation are optimized in particular at high sea.

This object is achieved according to the invention by an apparatus for picking up particles from the surface of a water system according to independent claim 1 as well as a method for picking up particles from the surface of a water system according to independent claim 8. Advantageous embodiments of the invention are the subject matter of dependent subsidiary claims.

The invention comprises the idea of an apparatus for picking up particles, in particular oil, algae or dirt particles, from the surface of a water system, having a particle separation space which is connected to an inflow opening through which water that contains particles can enter the particle separation space, a particle collecting space in which particles separated from the water that contains particles pass from the particle separation space through a separation mechanism, and an adjustment mechanism which is configured to regulate the filling level of the water that contains particles in the particle separation space.

According to another aspect of the invention, a method for picking up particles, in particular oil, algae or dirt particles, from the surface of a water system is provided, such that the method comprises the following steps: picking up water that contains particles from the surface of the water system through an inflow opening in a particle separation space and separating particles from the water that contains particles by passing the particles from the particle separation space into a particle-collecting space by way of a separation mechanism such that when the particles are separated the filling level of the water that contains particles in the particle separation space is regulated by means of an adjustment mechanism.

The apparatus utilizes a hydrodynamic separation technique. With the help of the adjustment mechanism it is possible to adjust the filling level of the water that contains particles in an optimized manner after it flows in through the inflow opening in the particle separation chamber, so that the separation of the particles from the water that contains particles in the particle-collecting space can be optimized in accordance with the prevailing conditions, for example high seas. With the help of the filling level adjustment, the upper edge of the filling level of the water that contains particles in the particle separation space can be adjusted relative to the separation mechanism, which serves to minimize the water content in the particle-collecting space and thus enables efficient utilization of the onboard storage tanks. In contrast with the state of the art, it is not necessary here to store the separation mechanism itself, although in one embodiment of the invention it may be provided as a supplementary measure. Regardless of such an adjustment of the separation mechanism, the separation process can thus be optimized for collecting the particles in the particle-collecting space.

In one embodiment, one or more particle-collecting spaces are formed on multiple sides or even on all sides of the particle separation space such that one or more separation mechanisms which are formed for example with ramp or embankment elements separate the spaces.

The apparatus for picking up the particles from the surface of the water system may preferably be designed for a self-propelled marine vessel having its own drive mechanism or a push unit, which is moved by a barge or marine vessel over the surface of the water.

A preferred embodiment of the invention provides that the adjustment mechanism has a pressure-regulating device, which is configured to adjust the filling level of the water that contains particles by means of an internal pressure regulation. Since the particle separation space and the particle-collecting space(s) are connected in one embodiment, the internal pressure regulation in this case is performed for a hermetically sealed total space comprising the particle separation space and the particle-collecting space(s). By increasing the internal pressure in the particle separation space, for example, with the help of a compressor, the water level in the interior of the ship drops. At the same time the draft of the carrier ship is also reduced and the order of magnitude of this change depends on the design of the carrier ship. Conversely, the water level inside the ship rises when there is a drop in the air pressure in the particle separation space.

In a preferred embodiment of the invention, it is possible to provide for the particle separation space to be formed as space which is a hermetically sealed with respect to the environment during operation. A seal with respect to the ambient air pressure may be provided in particular. The sealed space preferably includes one or more particle-collecting spaces in addition to the particle separation space.

An advantageous embodiment of the invention provides that the separation mechanism is formed with an embankment element. An embankment element may be provided either on the aft side or on the bow side between the particle separation space and the particle collection space, for example. A combined aft and bow design may also be provided.

A further embodiment of the invention preferably provides that the adjustment mechanism is coupled to a regulating device which is configured to process measurement data based on rough seas and/or draft and to derive control data for the adjustment mechanism therefrom. In one embodiment it is possible to provide that the sealed space as well as the adjustment mechanism will be monitored and controlled by the crew via an automatic water level control device and/or optically from the bridge of a carrier ship. It is possible in this way to respond to changes in the device based on rough seas and draft as it moves over the surface of the water system in order to be able to optimize the separation of particles in accordance with the situation. The draft of the device on the water system to be cleaned can be influenced in this way.

In an advantageous embodiment of the invention, a separation blade assigned to the inflow opening may be provided.

An advantageous embodiment of the invention provides for at least one eddy-stabilizing form element in the particle-collecting space.

In conjunction with advantageous embodiments of the method for picking up particles from the surface of a water system, the statements made in conjunction with the respective embodiments of the device for picking up particles from the surface of a water system are applicable accordingly.

DETAILED DESCRIPTION

In the following, the invention is described in greater detail by way of exemplary embodiments with reference to figures, in which:

FIG. 1 shows an apparatus for picking up particles from the surface of water system in cross section, and FIG. 2 shows a vertical section of a perspective view of the device from FIG. 1.

FIG. 1 shows a device for picking up particles from the surface of a water system. A hull body 1 is moved over a surface 2 of a water system to clean the surface 2 of the water system. As the hull body 1 moves over the surface 2 of water system, waves are calmed by means of a bow section 3 of the hull body 1. Particles of dirt floating on the surface 2 of the water system are displaced by the movement of the hull body 1 over the surface 2 of the water system into a flow which flows along a lower surface 4 of the hull body 1. The flow with the dirt particles flows beneath the hull body 1 into an inflow area 5, where an inflow or inlet opening 7 is formed next to a separation blade 6, so that water containing particles then passes through this inlet opening into a particle separation space 8. Downstream from the inlet or inflow opening 7, an eddy current is formed, so that the dirt particles float to the top in the particle separation space 8, i.e., to the surface of the water. A second eddy develops above the outlet opening of the particle separation space 8. Special form elements 14 serve to stabilize the eddies in the particle separation space 8. In this way, a pulsation of the eddies, for example, can be minimized or even entirely prevented.

A separation of the particles to be separated from the particle separation space takes place in particle-collecting spaces 10, 11, which are arranged next to one another and in which the particles are concentrated, the separation being accomplished by means of embankment elements or ramp elements 9, which belong to a separation mechanism for separating the particles. The separation method used corresponds to the principle of hydrodynamic separation.

During operation of the device shown in FIG. 1 for picking up particles from the surface 2 of the water system, a closed space 12 is formed, including the particle separation space 8 and the particle-collecting spaces 10, 11 and is hermetically sealed with respect to the environment in the embodiment shown here, in particular by means of an airtight design. With the help of a pressure-regulating device 13, an internal pressure in the closed space 12 is adjusted to thereby establish a filling level of the water that contains particles in the particle separation space 8 in this way so that the filling level is adjusted in relation to the embankment or ramp elements 9, which in turn influences the separation of the dirt particles from the particle separation space 8 into the particle-collecting spaces 10, 11. With the help of the internal pressure regulation, it is possible to respond to changes relevant to rough seas or the draft of the ship for the device in order to ensure optimal separation of particles in accordance with the situation. For this purpose, an automatic water level control device and/or an optical monitoring of the closed space 12 may be provided. The internal pressure can be increased and the water level can be lowered and/or the internal pressure lowered and the water level raised by compressors.

FIG. 2 shows a perspective diagram of the device from FIG. 1 in a sectional view. For the same features, FIG. 2 uses the same reference numerals as those used in FIG. 1.

The features of the invention disclosed in the preceding description, the claims and the figures may be important either individually or in any combination for the realization of the invention in its different embodiments.

The claims are as follows:

1. An apparatus for picking up particles from a surface of a water system, comprising:
   a particle separation space connected to an inflow opening through which the water that contains the particles enters the particle separation space, wherein the particle separation space is designed as a space that is hermetically sealed with respect to an environment;

a particle-collecting space into which the particles separated from the water that contains the particles reach from the particle separation space via a separation mechanism, wherein the separation mechanism is an embankment element between the particle separation space and the particle-collecting space; and an adjustment mechanism configured to regulate a filling level of the water that contains the particles in the particle separation space, wherein the adjustment mechanism has a pressure-regulating device configured to adjust the filling level of the water that contains the particles by regulating an internal pressure of the particle separation space.

2. The apparatus according to claim 1, wherein the apparatus is part of a hull body configured to move across the surface of the water, and the adjustment mechanism is linked to a regulating device which is configured to process measured data based on heavy seas and/or draft and to derive control data therefrom for the adjustment mechanism.

3. The apparatus according to claim 1, wherein a separation edge is assigned to the inflow opening.

4. The apparatus according to claim 1, wherein at least one eddy-stabilizing form element is in the particle separation space.

5. The apparatus of claim 1, wherein the particles include oil particles, algae particles, and dirt particles.

6. A method for picking up particles from the surface of a water system, wherein the method comprises the following steps:

receiving water that contains the particles from the surface of the water system through an inflow opening in a particle separation space, wherein the particle separation space is designed as a space that is hermetically sealed with respect to an environment; and separating the particles from the water that contains the particles by transferring the particles from the particle separation space into a particle-collecting space via a separation mechanism, wherein the separation mechanism is an embankment element between the particle separation space and the particle-collecting space;

wherein a filling level of the water that contains particles in the particle separation space is regulated by an adjustment mechanism in separating the particles, wherein the adjustment mechanism has a pressure-regulating device configured to adjust the filling level of the water that contains the particles by regulating an internal pressure of the particle separation space.

7. The method according to claim 6, wherein the apparatus is part of a hull body configured to move across the surface of the water, and measured data based on heavy seas and/or draft are processed by a regulating device, which is linked to the adjustment mechanism and control data for the adjustment mechanism are derived therefrom.

8. The method according to claim 6, wherein the water containing particles is picked up from the surface of the water system through the inflow opening by means of a separation edge assigned to the inflow opening with subsequent utilization of an eddy formation.

9. The method according to claim 6, wherein an eddy is formed in the water that contains particles in the particle separation space and stabilized by means of at least one eddy-stabilizing form element.

10. The method of claim 6, wherein the particles include oil particles, algae particles, and dirt particles.

* * * * *